United States Patent [19]

Jutier et al.

[11] Patent Number: 4,539,593
[45] Date of Patent: Sep. 3, 1985

[54] APPARATUS FOR THE ACQUISITION AND RESTORATION IN REAL TIME OF A PICTURE FORMED FROM SUCCESSIVE FRAMES OF SCANNING LINES

[75] Inventors: Pierre Jutier, Paris; Bernard Bretagnolle, Grenoble; Claire Rubat du Merac, Meylan, all of France

[73] Assignee: Institut National de la Sante et de la Recherche Medicale, Paris, France

[21] Appl. No.: 454,247

[22] Filed: Dec. 29, 1982

[30] Foreign Application Priority Data

Jan. 15, 1982 [FR] France ................................ 8200590

[51] Int. Cl.³ .............................................. H04N 5/14
[52] U.S. Cl. .................................... 358/160; 358/166; 358/37; 364/136
[58] Field of Search ................. 358/160, 166, 37, 162, 358/164, 280, 287; 364/136, 132; 340/728, 735, 750, 790; 382/41, 54

[56] References Cited

U.S. PATENT DOCUMENTS 3,757,038 9/1973 Jannery et al. .................... 358/160

FOREIGN PATENT DOCUMENTS 2465273 9/1979 France .

OTHER PUBLICATIONS

IEEE Proceedings-E, Computer and Digital Techniques, vol. 129, No. 1E, Jan. 1982; Duck et al.; pp. 28-32.
International Conference on Digital Signal Processing, Aug. 30-Sep. 2, 1978; Boscolo et Mottola: pp. 335-337.
Journal of Physics E./Scientific Instruments, vol. 11, No. 12, Dec. 1978; pp. 1191-1194.

Primary Examiner—John C. Martin
Assistant Examiner—Michael D. Parker
Attorney, Agent, or Firm—Oblon, Fisher, Spivak, McClelland & Maier

[57] ABSTRACT

An apparatus for the acquisition and restoration in real time of a framed picture as disclosed. This apparatus utilizes an automaton and a slave circuit of the automaton for the addressing of a memory through the use of digital values from an analog-digital converter for analog picture acquisition signals. The digital values are processed and supplied to a digital-analog converter for the display of a picture on a display unit. Addressing outputs of the automaton are connected to the memory with the outputs of the slave circuit being connected to the synchronization inputs of both the analog-digital and the digital-analog converters in order to display picture corresponding to the processed digital values.

13 Claims, 8 Drawing Figures

APPARATUS FOR THE ACQUISITION AND RESTORATION IN REAL TIME OF A PICTURE FORMED FROM SUCCESSIVE FRAMES OF SCANNING LINES

BACKGROUND OF THE INVENTION

The present invention relates to an apparatus for the acquisition and restoration in real time of a picture or image formed by successive frames of scanning lines. This invention applies to the processing of pictures and particularly the processing of pictures supplied by a video camera with a view to their possible display on a television screen. It relates more specifically to the processing of framed pictures supplied by an electron microscope.

It is known that for the processing of framed images, scanned by successive lines, it is necessary to convert into digital values, the analog signals obtained at the output of a picture production system (the analog-digital converter is called in this case the acquisition system). These digital values are recorded in a memory and, in general, the acquisition and real time display means for a picture formed from successive frames of scanning lines, with which it is possible to process the picture, are constituted in the following manner.

Following the picture production system, these means comprise an analog-digital converter making it possible to convert the analog signals obtained at the output of the picture production means into digital values. These digital values are transferred by means of a communication bus into a recording memory. A processing system is connected to this memory for processing the digital values. A wire address generator makes it possible to ensure the writing and reading of the digital values written in the memory, before or after they have been processed. The processed digital values extracted from the memory are then transmitted to restoration or display means via a digital-analog converter. All the control circuits permitting, optionally in association with processing means, the passage of the digital values supplied by an analog-digital converter connected to the picture production means, are wired circuits which lack any flexibility of use.

It is known, e.g. in television, that each picture or image is framed. This picture is obtained by juxtaposing a certain number of horizontal lines, a group of which constitutes a frame. This frame is renewed several dozen times per second.

The electrical signal corresponding to this picture comprises an analog part, expressing the light intensity, and a part having a pulse-like nature: the synchronizing or sync making it possible to mark or define the line and frame starts (horizontal and vertical synchronization). It is this electrical signal, called the "composite video signal", which is transmitted by all appropriate means and from which it is possible to reconstitute the picture on arrival. It is known per se to convert this analog signal into a succession of digital values for transmission or processing purposes.

The prior art will be better understood by means of the following diagrammatic drawings, wherein show:

FIG. 1 diagrammatically a per se known apparatus for the acquisition and display of a television picture, not using a signal processing system.

FIG. 2 diagrammatically, a known acquisition and display apparatus for a television picture, which uses an acquired signal processing system.

FIG. 3 diagrammatically but in more detailed manner the known apparatus of FIG. 2.

The simplest known acquisition and display apparatus shown in FIG. 1 comprises a video camera 1 (or any other equivalent picture source), an analog-digital converter 2, transmission means 3, a digital-analog converter 4 and restoration or display means, such as a video monitor 5.

The constraints imposed on the conversion and processing means differ to a considerable extent, depending on whether it is transmission or processing which is involved. In the first case, it is merely necessary for these means to have an adequate operating frequency to ensure the faithful restoration of the overall signal, i.e. that part of the signal representing the luminance (quality of the image, fineness, constrast, etc) and that part containing the sync pulses or signals (stability, centering, etc), without it being necessary to take account of the significance of these sync signals. In particular, converters 2 and 4 can operate independently (both of one another and of the transmission means 3) for as long as the minimum frequency condition referred to hereinbefore is satisfied.

The situation is quite different when, following the means for producing the picture and for the analog-digital conversion of the analog signals representing said picture, the digital values undergo processing, prior to their transfer to the digital-analog converter and to the restoration or display means.

FIG. 2 diagrammatically shows a known acquisition and restoration apparatus including a system for the processing of the digital values from an analog-digital converter. In this case, it is necessary that the digital value corresponding to each dot in the image is located at a perfectly defined location within a computer memory. In other words, there must be a biunivocal application between the bidimensional space of the picture and the unidimensional addressing space. This is only possible through referring to the marks of the X, Y coordinates of the picture, or in other words to the horizontal and vertical sync signals, this applying both at the time of acquisition (analog-digital conversion) and at the time of display (digital-analog conversion). Thus, the operation of the converters must be made dependent on the synchronization sources on the one hand, and on the processing memory addressing system on the other, which is shown in FIG. 2. Compared with FIG. 1, FIG. 2 additionally has the control means 6 of the analog-digital converter and the control means 7 of the digital-analog converter, with the corresponding logic links.

Bearing in mind the inevitable redundancy between the control means 6 and 7, it is preferable to refer to FIG. 3, which is operationally equivalent to FIG. 2.

In FIG. 3, as in FIGS. 1 and 2, the general movement of the information or digital values takes place from left to right from production to display (image restoration). The processing means are now subdivided into four functional blocks, i.e. from top to bottom: the actual processing means A, the storage means constituted by a picture store B, control means C and a video sync generator D. The information passes between the analog-digital converter 2 and digital-analog converter 4, the memory and the processing means by data bus K.

Mention is only made in passing of processing means A because, although their presence conditions the complexity of the diagram, their function can be desynchronized from the acquisition and display functions, so that it is possible to process the latter independently. It should be noted that the processing means can be distributed in memory B, if the structure of the latter is suitable. Memory B is a random access informatics memory, so that its structure can differ widely. In can be in particular broken down into modules, with the possibility of simultaneous access to several of these modules (multiaccess). The control means C ensure the biunivocal correspondence between the picture (acquired or restored) and the memory space, by coordinating the conversion operation with the corresponding memory accesses (both output and input). The control means fulfil this function by simultaneously supplying the desired address values on the address bus E intended for memory D and sync signals H and J to the converters.

Finally, the video sync generator D has been separated from the control means in order to take account of the prior art. Thus, such members now exist in the form of single integrated circuits supplying all the signals necessary for obtaining a video image (horizontal and vertical sync pulses, start of image, beam extinction signals, camera control, etc). It should be noted that during acquisition, video synchronization can take place directly on the camera (or extracted from the composite video signal), and suggested at F in FIG. 3. The other term of the alternative is to synchronize the camera 1 with respect to generator D by line G.

Moreover, for each of the television standards the frequency requirements of the video sync generator are very precisely defined and a greater flexibility is obtained as a result of this separation of functions.

BRIEF SUMMARY OF THE INVENTION

The object of the invention is to obviate the disadvantages of the known picture acquisition and display means including the processing and control means interposed between the picture production means and the picture restoration means. The main disadvantages thereof result from the fact that the picture acquisition and restoration control means are only wired and are therefore complex, costly and relatively unreliable. It is also possible with such cabled means to easily modify the procedures for obtaining and exploiting the digital values stored in the memory. The reason is that for acquiring an image with an acceptable definition in the period of time between two successive frames, it is necessary to use high conversion frequencies, e.g. above 10 MHz for 512 dots per line in the 625 line system.

Thus, the invention aims at providing a picture acquisition and display apparatus including memory addressing and control means which offer the following advantages:

random choice of video standard: number of interlaced or non-interlaced lines, instantaneous modification of this choice;

free and dynamic choice of the representation of the image in the memory with, inter alia, the possibility of loading a given value (corresponding to one dot of the image) in several locations of the memory (retrieval);

physical and/or logic organization of the picture memory largely immaterial (within certain performance limits);

possibility of making the instantaneous operation and choice of options dependent on an informatics supervision member (central computer);

easy reconfiguration by reprogramming (without equipment modification);

reduction of complexity and cost, improvement of reliability.

According to the invention, these results are obtained by transferring to control means, more particularly comprising a programme automaton, part of the functions hitherto performed by wired means. This is made possible by making maximum use of one of the essential characteristics of the video picture, namely the considerable variation between the horizontal frequency and the vertical frequency. It is known that if a line lasts 64 $\mu$s, the duration of a frame is 20 ms (in the 625 interlaced line standard) and it can be seen that if the first time requires wired means, the second is accessible to a programmed automaton.

Therefore, and as will be described in greater detail hereinafter, in the apparatus according to the invention, the functions of the means controlling the picture acquisition and restoration members are performed by wired means and programmed means.

Thus, the wired means act on each scanning line in a maximum of a few dozen microseconds and are realised by assembling simple, rapid logic elements (e.g. in TT1 or ECL technology), which only permit the most elementary programming, such as the initial loading of a counter.

Thus, the programmed means are constituted by a programmed automaton realised e.g. by means of a high speed microcomputer of a commercially available type. This programmed automaton receives the video sync pulses (horizontal, vertical, picture start) and, as a function of the data, processes control signals intended for the wired parts, which can be called a rapid sampling clock.

In addition, the programmed automaton receives messages from a supervisor able to choose one of the many possible automaton programmes and able to start operation on the basis of the chosen programme, which is then called the programme taking place. The range of possibilities programmed in advance can be extended at random, i.e. operation in acquisition or restoration, number of lines, which may or may not be interlaced, number of dots per line, destination or origin area in the memory, retrieval areas in the memory, etc.

The programme can be obtained in any appropriate recording means, such as read-only memories, i.e. easily updated by simply replacing the housings. They can also be recorded in a random-access memory, a supervisor then being responsible for their management and installation prior to starting.

The function of the wired control means is then limited to a rapid, cyclic addressing sequencing in a narrow range limited e.g. to 256 or 512 dots (representing a rotation on max. 9 bits) and the transmission of control signals for the converters and possible bus barriers controlling accesses to the memory.

The Junction between the wired and programmed means takes place with respect to the counting of the lines. This function can be carried out by the programmed automaton if it is able to activate, increment (or decrement), test, decide, act in the given delay (.e.g. 64 $\mu$s.), etc. If not, this function can be performed by an optionally programmable wired counter reacting on the automaton. Obviously, the first solution, which ensures maximum flexibility is preferable from all points of view.

The invention therefore specifically relates to an apparatus for the acquisition and restoration in real time of a picture formed by successive frames of scanning lines, comprising picture production means 1 supplying analog signals which are representative of a picture, at least one analog-digital converter 2 receiving these analog signals and supplying digital values, processing means A able to process these digital values and/or produce other digital values able to constitute a picture for permitting a display of the storage means B of the digital values to be processed and of digital values which have been processed or produced, at least one digital-analog converter 4 for the digital values supplied by the memory, means D for synchronizing the picture production means and the digital-analog converter, a communication bus K between the storage means B, the processing means A and converters 2 and 4, as well as control means C1, C2 connected to the synchronizing means D for controlling the addressing of the storage means and for synchronizing converters 2, 4, wherein the control means comprise a programmable automaton C1 and a wired control circuit C2, which is dependent on automaton C1, the automaton C1 and the control circuit C2 having addressing outputs 7, 8 connected to addressing means of the storage means B, whilst other outputs of the dependent control circuit C2 are connected to synchronizing inputs of converters 2, 4 for permitting the acquisition and restoration of the picture corresponding to the digital value recorded in the memory.

According to another feature, the programmable automaton C1 is a processor controlling the dependent control circuit C2 and which, with the latter, is able to address the storage means B in such a way that the processing means are able to process the digital values corresponding to the acquired and/or restored picture as a function of information supplied by a supervisor 9 of the programmable automaton.

According to another feature, the dependent control circuit C2 is able to address storage means B in such a way that the processing means A are able to process the digital values corresponding to the scanning lines of the picture, as a function of the programming of the automaton.

According to another feature, the addressing outputs 7, 8 are connected to the addressing means via a distributor member C3.

According to another feature, the apparatus also comprises a sync separator SSY supplying position fixing signals consisting of a picture start signal IS, a vertical scanning signal VS and a horizontal scanning signal HS, as well as video signals VIDE, which are free from sync pulses, the position fixing signals being applied to the programmable automaton C1 via a switch COM, whilst the video signals are applied to the analog-digital converter 2.

According to another feature, the apparatus also comprises a demultiplexer DMX for the digital values supplied by the analog-digital converter C2, a multiplexer MX receiving the process digital values and a mixer MIX connected between the display means 5 and the digital-analog converter 4 for mixing the output signals of said converter 4 with a sync signal S supplied by the sync means D.

According to another feature of the invention, the dependent or slave circuit C2 comprises an conversion frequency generator FC actuated by the programmable automaton C1, two counters P1, P2 connected to the programmable automaton C1 and to generator FC, an address sequencer S1 connected to counters P1, P2 for controlling the addressing of memory B, one of these two counters supplying the sync signals CMDX, SYCAN, CMUX, SYCNA of the demultiplexer DMX, the analog-digital converter 2, the multiplexer MUX and the digital-analog converter 4.

According to another feature, the programmable automaton C1 comprises a processor C7, whose inputs are connected to the switch COM and to the supervisor 9 and whose outputs are connected on the one hand to the slave circuit and on the other to the storage flip-flops C4, C5, C6 with three-state output amplifiers, the outputs of these flip-flops being connected to addressing means of the memory B.

According to another feature, the processor C7 is a monohousing microcomputer.

Finally, the apparatus is used for the acquisition and restoration of the framed picture supplied by an electron microscope or a video source, as well as for the synthesis of video pictures.

BRIEF DESCRIPTION OF THE DRAWINGS

The invention is described in greater detail hereinafter relative to non-limitative embodiments and the attached drawings (FIGS. 1 to 3 having already been described), wherein show.

DETAILED DESCRIPTION OF THE PREFERRED EMBODIMENTS

Figure 1:
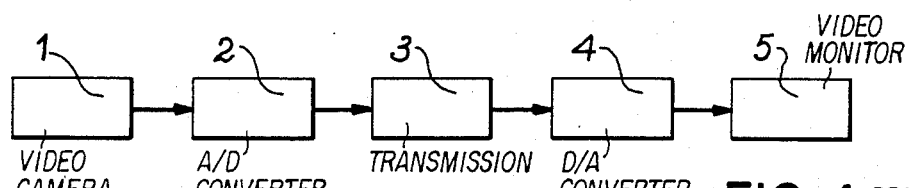
Figure 2:
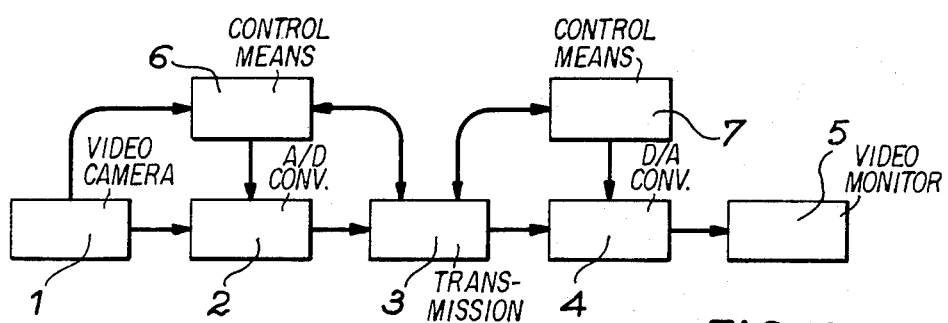
Figure 3:
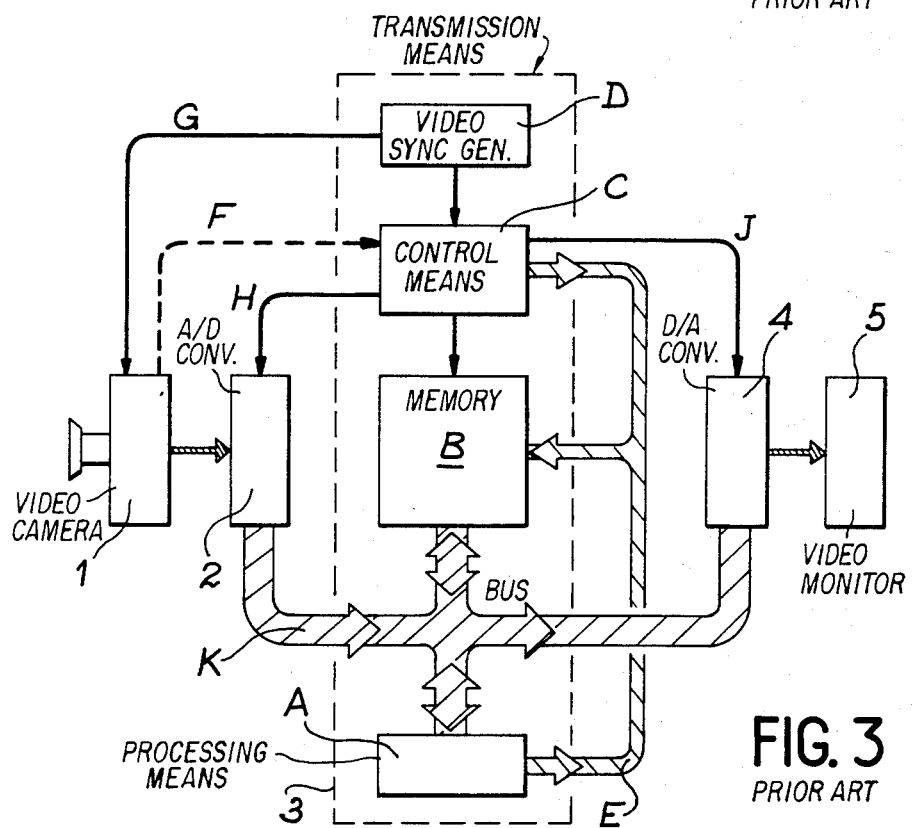
Figure 4:
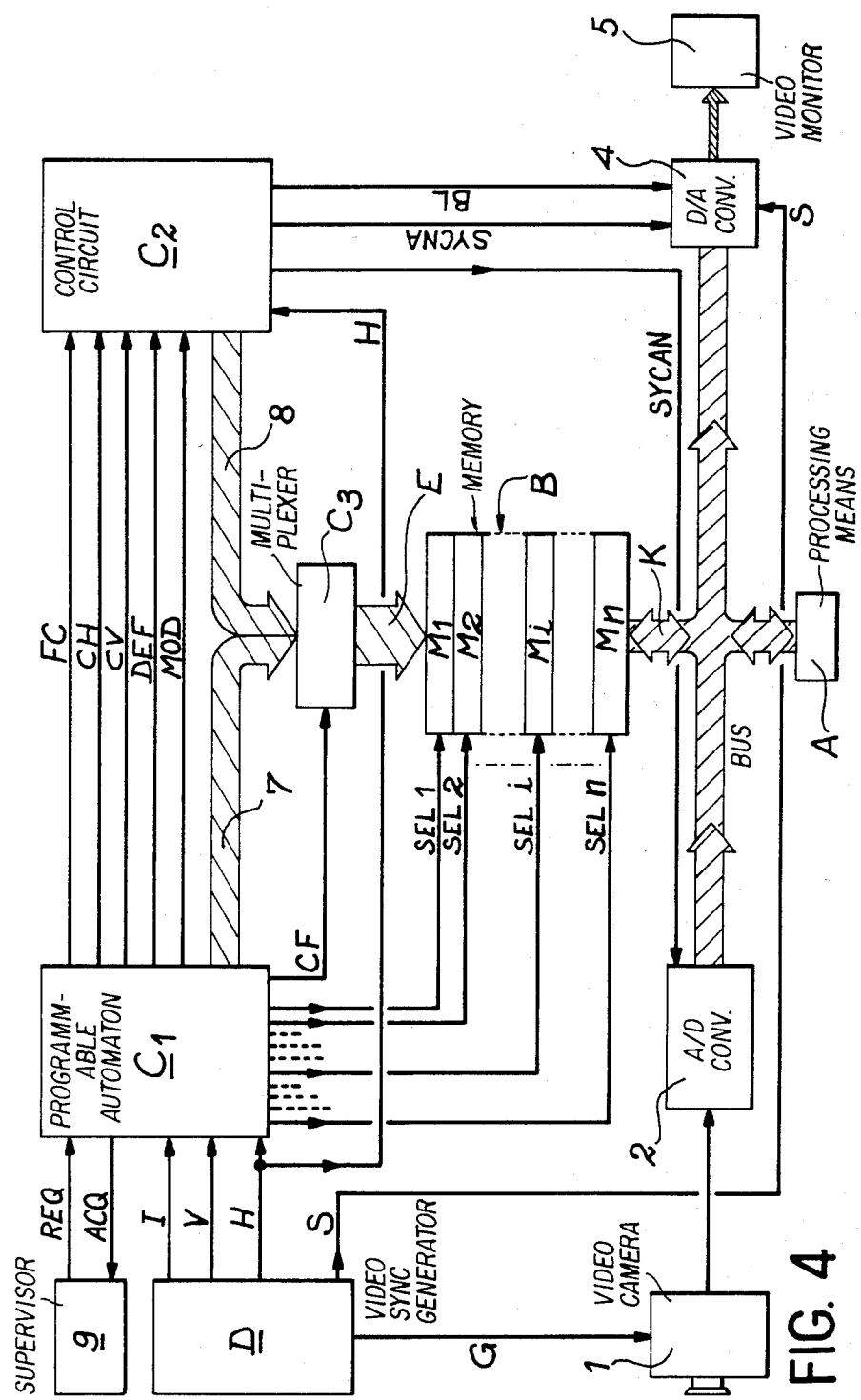
FIG. 4 diagrammatically, an acquisition and restoration apparatus according to the invention.

FIG. 4 diagrammatically shows an acquisition and restoration apparatus according to the invention, which makes it possible to acquire and restore in real time, a picture formed by successive frames of scanning lines.

This apparatus comprises picture production means 1, which are formed e.g. by a video camera and supply analog signals representing the image, at least one analog-digital converter 2 receiving the analog signals and supplying digital values, processing means able to process or produce digital values to permit the restoration of a picture, e.g. on display means 5. The apparatus also comprises means B for the storage of the digital values to be processed and the processed or produced digital values, as well as at least one digital-analog converter 4 for the processed or produced digital values and means D for synchronizing the picture production means and the digital-analog converters. Finally, the apparatus comprises a communication bus K between storage means B, processsiug means A and converters 2, 4. Control means C1, C2, which will be described is greater detail hereinafter, are connected to the synchronization means D for controlling the addressing of the storage means B and the s.ynchronization of converters 2, 4. Control means C1, C2 comprise a programmable automaton C1 and a wired control circuit C2, which is dependent on the automaton. Automaton C1 and control circuit C2 have addressing outputs 7, 8 connected to addressing means (not shown and known) for the storage means B. Other outputs of the slave control circuit C2 are connected to the synchronization inputs of converters 2, 4 for permitting the display of the picture corresponding to the processed or produced digital values. Converters are understood to mean conversion means suitable for the type of picture or image signal used. For example, in the case of a normal chromatic image, these converters are in three separate parts corresponding to the three components green, red and blue of the colour signal.

The programmable automaton C1 is a processor controlling the slave control circuit C2 and which is able to address by its outputs 7, the storage means B in such a way that the processing means A are able to process the digital values corresponding to each frame of the picture, as a function of the programming of automaton C1.

The slave control circuit C2 is a wired logic circuit able to address by its outputs 8, the storage means B in such a way that the processing means A are able to process the digital values corresponding to the picture scanning lines, as a function of the programming of automaton C1.

The addressing outputs 7, 8 of automaton C1 and control circuit C2 are connected to the addressing means of storage means B via a distributor member C3, which can be constituted by a multiplexer.

The storage means B are broken down into n modules $M_1, M_2 \ldots M_i \ldots M_n$ (whereby n can be reduced to 1). Each of these modules $M_i$ can be activated independently of the others by a selection line SELi, in such a way that several modules can simultaneously receive information from data bus K.

Normally, the apparatus operates either in acquisition, e.g. on the basis of a video camera, or in restoration towards the storage means 5, it being obvious that between acquisition and said display, processing takes place by processing means A. This processing must take account of the way in which the digital values are loaded into memory B under the control of automator C1 and circuit C2. The programming of automaton C1 can take from a supervisor 9.

However, the acquisition and display functions can be simultaneous, in which case the digital data from the analog-digital converter 2 are directly transmitted to the digital-analog converter 4, without any intervention of memory B. This operating mode is made possible by the data bus K. It must be assumed that the word bus covers not only the conductors transmitting the signals, but also the switching means linked with these conductors, e.g. three-state barriers.

However, it is also possible to envisage a multiplexing of the data bus K, which permits a simultaneous acquisition in a certain zone of the memory and a restoration from another zone (which may or may not overlap with the preceding zone). Such an operating mode presupposes either a weak definition of the image, or very high performance levels of the memory and the converters.

The control functions are essentially distributed between two separate members, namely the programmed automaton C1 and the control circuit C2, which is dependent on automaton C1. The synchronizing means D in this case control camera 1 by a signal G and consequently always operate in the acquisition mode and in the restoration mode. These synchronizing means supply signals H (line start), V (field start) and I (picture start) at the three inputs of automaton C1.

The selection lines SELi of memory modules $M_i$, a group of address wires 7 and a certain number of control lines FC, CH, CV, DEF, MOD intended for the control circuit C2 all emanate from automaton C1. Finally, automaton C1 receives selection and starting instructions REQ from supervisor 9 and may supply to the latter acknowledgements of receipt ACQ.

In addition to the control signals indicated hereinbefore, control circuit C2 receives the horizontal sync signal H permitting the synchronization of this circuit at each line start. It transmits two types of signal, on the one hand converter control signals SYCAN to the analog-digital converter and SYCNA and BL to the digital-analog converter, and on the other hand address values in parallel on wires 8 intended for the memory.

Control circuit C2, which is not shown in detail here, essentially comprises a reference oscillator, frequency dividers, counters and switching or temporary storage members. All its operating parameters are defined by the aforementioned control signals. It is pointed out that there is no need to define here the transmission mode (series or parallel) of these parameters. FC is a pulse-type signal indicating the effective conversion frequency (.e.g. 12.5 or 6.25 MHz), CH defines the horizontal centering, e.g. the number of reference oscillating cycles elapsing between pulse H and the effective start of the conversion, CV gives the vertical centering (indicating whether a given line of the image must or must not be converted), DEF indicates the definition, in other words the number of dots effectively taken into account during the conversion phase and MOD indicates the mode, i.e. acquisition or restoration.

Figure 5:
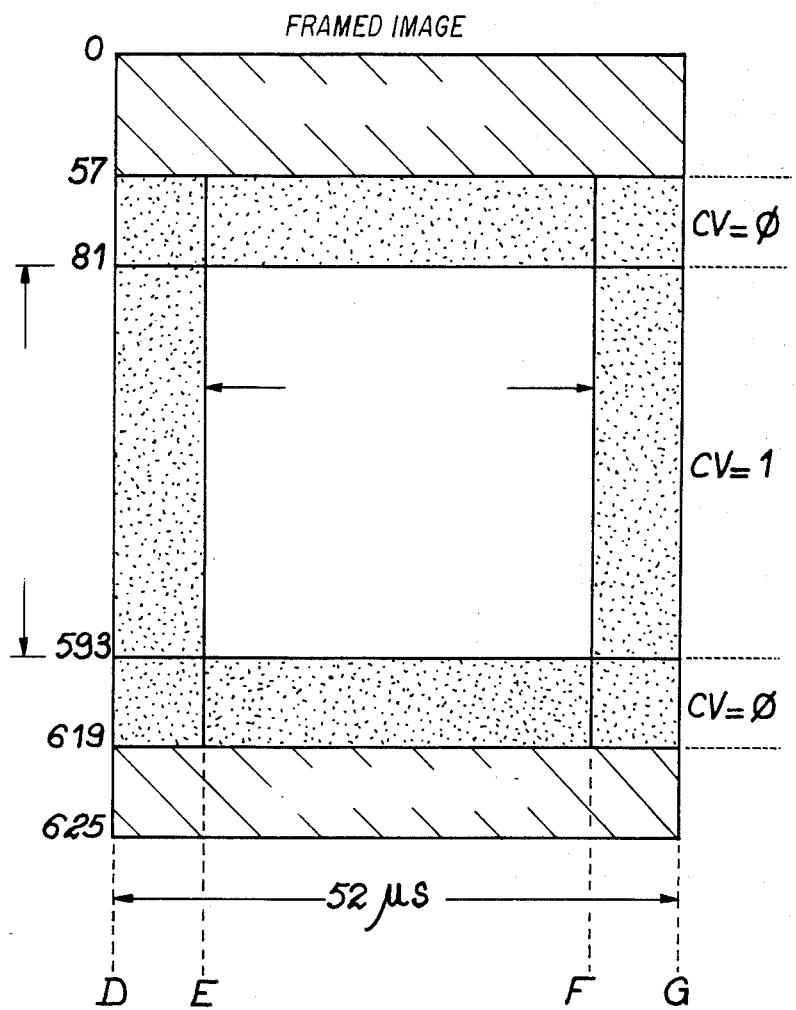
FIG. 5 an example of the scanning of a framed picture performed with the apparatus according to the invention.
Figure 6:
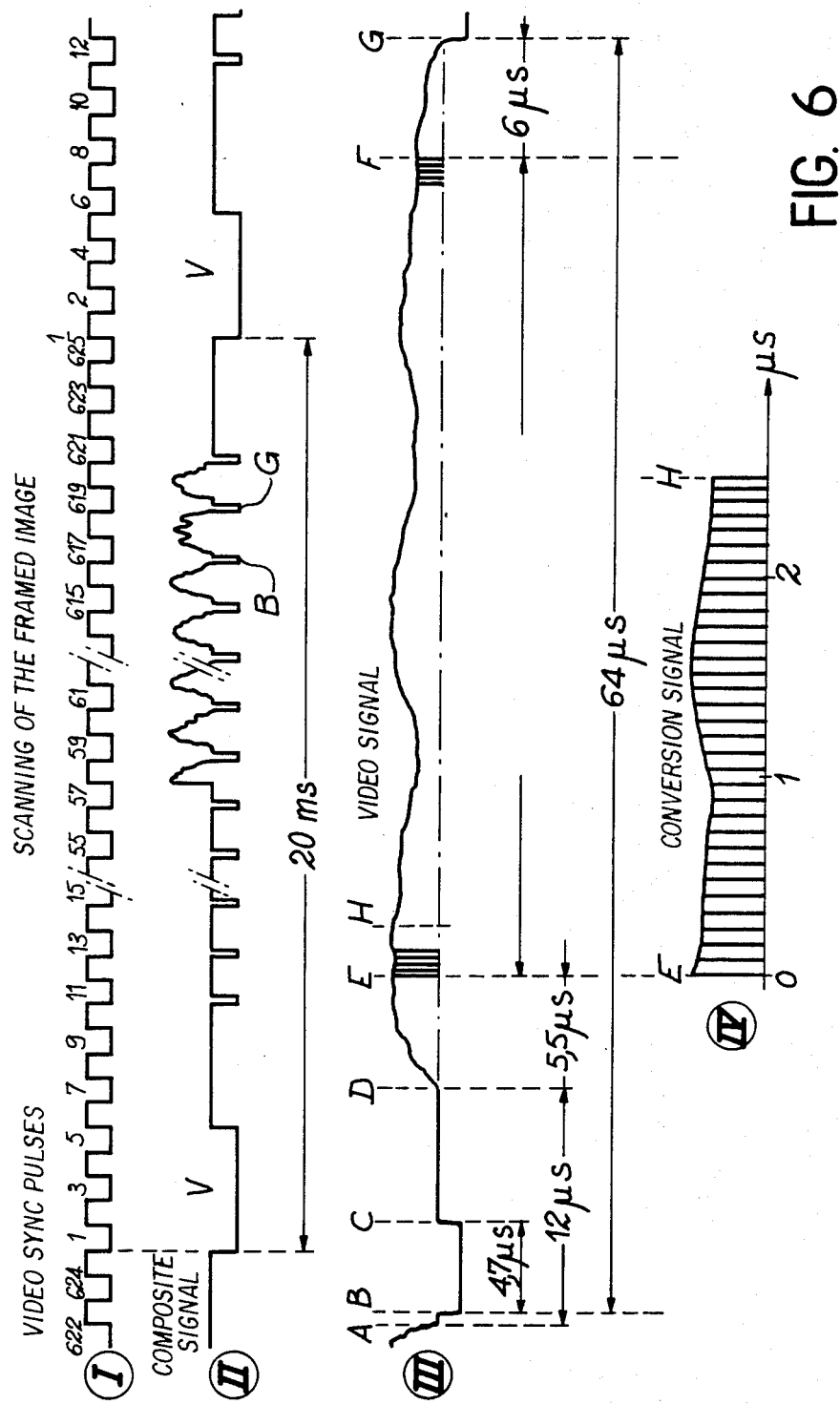
FIG. 6 at I, II, III and IV, the main signals involved in the apparatus according to the invention for performing the scanning of FIG. 5.

FIGS. 5 and 6 show an example of the scanning of a framed image, as well as certain of the signals involved in the apparatus for performing this scanning operation. Details will be given on how various parameters are involved in the acquisition or restoration of a picture, by examining a particular embodiment illustrated by FIGS. 5 and 6, which relate to an interlaced 625 line picture, i.e. with two fields. At I in FIG. 6 are shown the basic video sync pulses (line frequency of 15625 Hz) for an uneven field and the start of the following even field, the corresponding composite signal being represented at II. The numbers indicated at I are the numbers of the lines (the vertical sync pulses V are not indicated). As is shown in FIG. 5, the beam extinction phase (permitting the return thereof between two frames) extends up to line 57 and recommences at line 621, which represents a total loss of 63 lines for the two frames. 526 lines remain, of which only 512 lines are required, so that there is a margin of 25 lines at the top and bottom of the picture.

To achieve this, automaton C1 counts the lines from the vertical synchronization and switches signal CV from logic state 0 to logic state 1 for example when it reaches line $N_0$ (81) to bring it from 1 to 0, when the count reaches 593 (for the uneven frame). When CV=0, the controlled circuit is blocked and when CV=1 it operates line by line in display and in restoration. Moreover, the control signal BL of the beam in restoration can be made directly dependent on CV, so as to automatically obtain black bands above and below the 512 lines which are effectively taken into account.

The video signal between two consecutive line starts (B to G, at II in FIG. 6) is shown at III in FIG. 6. The start of the line is taken at the falling front B of the horizontal sync pulse B-C. The beam extinction range corresponding to line return extends from A to D. The useful image consequently extends from D to G, as is also shown in FIG. 5. From this image, it is wished to extract 512 correctly centered dots with a conversion rate of 12.5 MHz, which gives a conversion time of 41 μs for each line. Under these conditions, conversion must start at E, roughly 17 μs after the line start and finishes at F (6 μs before the start of the next line). At IV in FIG. 6, it is possible to see a magnification of the conversion start E-F. To obtain this result, the control circuit must be formed, in the manner shown hereinafter, by a first counter preferably actuated by a reference clock, which is initialized at a value corresponding to the horizontal centering parameter CH and which restarts at each pulse H. On reaching the prescribed count (at point E of III—FIG. 6), it starts the address sequencer and a second counter passing from 0 to 512, in order to stop at F corresponding to the right-hand margin of the picture, or else the conversion, or progression of the addresses, at least the writing into the memory or the restoration of the digital values (cf also FIG. 5). In the same way BL (FIG. 4) can be made dependent on said second counter, in order to automatically extinguish the beam between D and E and between F and G, in order to obtain black left and right vertical margins at the time of display. The second counter is actuated by the conversion frequency (equal to 12.5 MHz in the above example), which can be chosen within certain limits and can be obtained either by division on the basis of a fixed reference frequency, or by means of a variable oscillator controlled by the voltage (called VCO), or by a combination of these two means.

It is now necessary to define to what precisely correspond the two address buses 7 and 8 emanating respectively from the programmable automaton C1 and the control circuit C2 (FIG. 4). In the case e.g. of a non-interlaced picture of 512 lines and 512 dots, which must be converted at a rate of one octet per dot and loaded into an octet-organized memory, the memory capacity necessary is equal to 256 k octets corresponding to one address for 18 bits. It can immediately be seen that the 9 least significant bits can correspond to the 512 dots of a line and the 9 most significant bits to the 512 lines. This is the simplest solution in which the values are simply stacked in the memory in the sequential order of the addresses as they are acquired. It has therefore been possible to define a 9 bit dot address bus 8 (e.g. AP0 to AP8) and a 9 bit line address bus 7 (AL0 to AL8). These two buses are combined to form the overall address bus E (A0 to A17) of picture or image memory B. For simplification purposes, it has been assumed that each module $M_i$ has an adequate capacity and that only a single module is used. There is an immediate correspondence between AP0-AP8 and A0-A8 on the one hand and AL0-AL8 and A9-A17 on the other.

It will now be assumed that it is only wished to have a picture with 256 dots per line. The dot address bus is reduced to 8 bits and bit AP8 is no longer actuated by the control circuit. Whilst maintaining the aforementioned correspondence, the memory is only significantly filled by blocks of 256 octets separated by "dead" blocks of the same size.

In order to reobtain the compact filling of the preceding case, it is necessary to switch A8 in order to bring about correspondence with one of the bits of the line address bus (AL0-AL8), it being accepted that the new programme of the automaton for the case of 256 dots per line is able to cope with this situation and advances the line addresses in an adequate manner. This switching of the boundary bits between the two buses, respectively the dot address and the line address buses, involves the use of a distributor system C3 controlled by signals CF from the programmed automaton C1. The distributor system C3 can be constituted by a multiplexer.

Figure 7A:
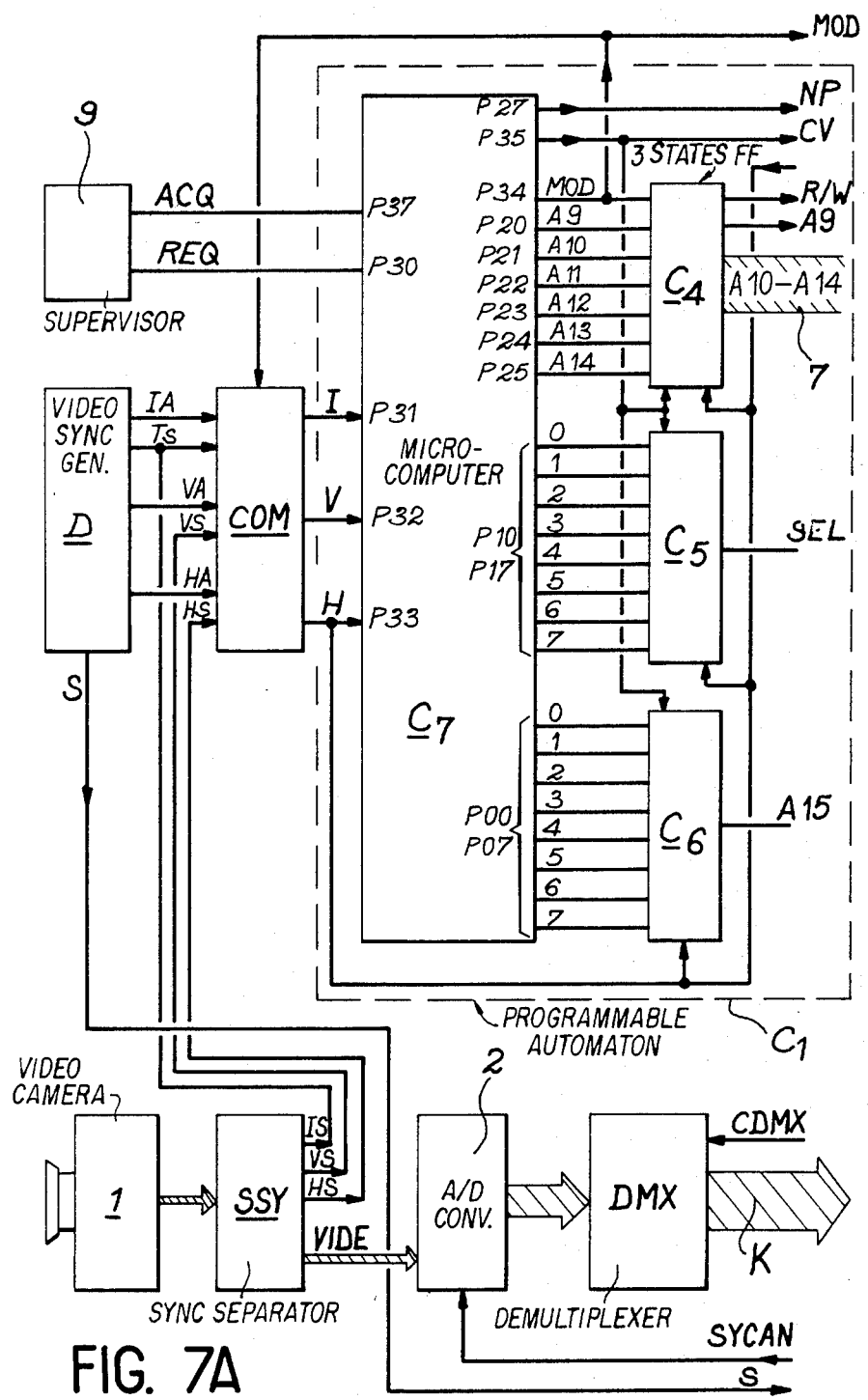
FIGS. 7A and 7B diagrammatically, but in a more detailed manner, a variant of the apparatus according to the invention.
Figure 7B:
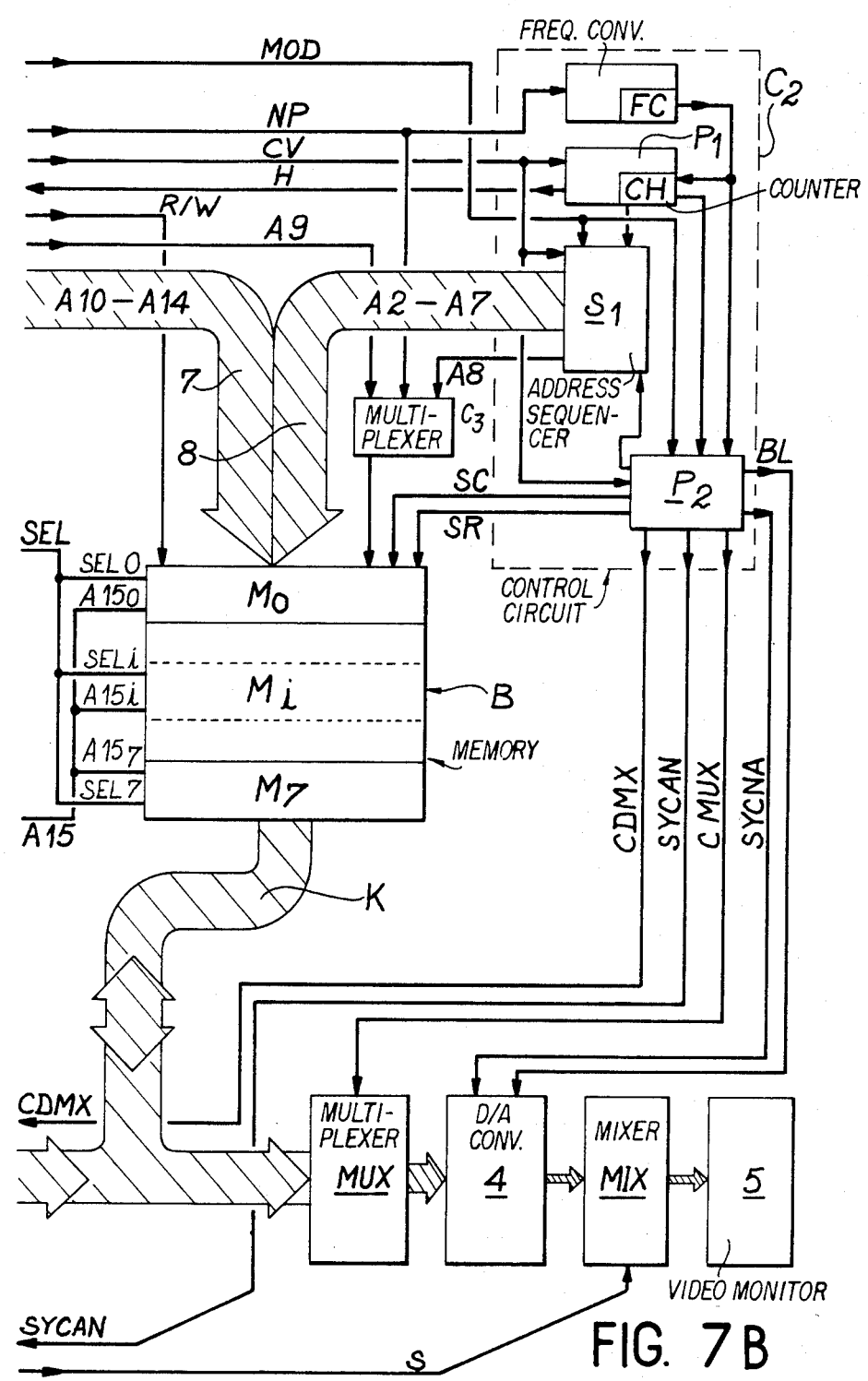

A more detailed description will now be given of a constructional variant of the invention, with reference to FIGS. 7A and 7B in which all the elements appearing in the previous drawings are designated by the same symbols.

In this case, the apparatus is shown in a more detailed manner. It also comprises a sync separator SSY, a demultiplexer DMX for the digital value supplied by the analog-digital converter 2 and a multiplexer MUX of the digital values from memory B, prior to their conversion by the digital-analog converter 4. Finally, a mixer MIX is positioned between the digital-analog converter 4 and the display means 5. The apparatus also incorporates other means, which will be described i.n greater detail hereinafter. The slave circuit C2 is shown in a more detailed form. It is possible to see a first counter P1, a second counter P2, an address sequencer S1 and an internal generator, which in particular supplies the conversion frequency FC.

The memory is constituted by 8 modules, each having 32 dynamic memory housings of 16 K×1 bit. Thus, each module has a capacity of 64 k octets. The information exchanges take place by a data bus K in parallel on 32 bits (4 octets), in order to have transfer speeds which are compatible with existing memories. The addresses in the memory use 14 bits (A2 to A15—like the addresses of the individual housings) in the form of twice 7 multiplexed bits: row addresses and column addresses, multiplexing being controlled by two specific signals, respectively row selection SR and column selection SC, transmitted one after the other in a given time ratio. Certain constraints exist on the row addresses (limited significance) which must be sequentially incremented at relatively close intervals to ensure their "refreshening". The two address bits A0 and A1 do not appear and correspond to the individualization of the 4 octets contained in the 32 bit bus. It should also be noted that the not shown processing means can be distributed between the memory modules M0 to M7.

Following camera 1, there is a sync separator SSY, which is knon per se, and which supplies on the one hand the three position fixing signals, picture IS, vertical VS and horizontal HS and on the other hand a video signal, which is free from sync pulses VIDE intended for the analog-digital converter.

During operation in restoration, the sync signals I, V and H for programmed automatons C1 are consequently obtained from the incoming composite video signal. It is then the sync generator D which functions and supplies IA, VA, HA, a triple switch COM controlled by signal MOD ensuring the selection between these.

The programmed automaton C1 is realised by a commercial monohousing or monobox microcomputer C7 (e.g. Zilog model Z7 or any other model offering performances of the same order of magnitude). Such a microcomputer essentially comprises, apart from a few service pins (supply, clock, resetting, bus controls), 32 pins distributed into four groups of pins, having in each case 8 bits, which can almost all be programmed in a arbitrary manner in input or output. In view of the flexibility offered by this programming, it is obviously possible to obtain a given result by using the many varied combinations of pins and that the configuration described hereinafter is only one example from among many.

The group (P10–P17) supplies 8 signals SEL0 to SEL7 for the selection of memory modules M0 to M7. The group (P00–P07) supplies eight different values of the address bit A15 to the said modules. Group (P20–P25) supplies the line address bits A9 to A14 and to P27 a signal NP indicating the number of dots (512 or 256). All the signals of the bus type (addresses and SEL) are immobilized in the memory flip-flops with output amplifiers having three states or barriers (C4, C5, C6) in order to enable other undefined devices to act on the address bus. It should be noted that under certain conditions, the functions of barriers C4, C5 and C6 can be directly taken into account by the microprocessor and groups ∅ and 1 can be placed under high impedance and group 2 with open drain. These supplementary barriers have the advantage of supplying a much higher electric power on the bus, whilst improving the flexibility. Thus, their content is updated by line pulse H, any time interval up to the next H being available for the preparation of the following line. Moreover, they are opened in the direction of the bus by the vertical cenering signal CV.

Group (P30–P37) receives the three video sync signals I, V and H on P31, P33 ensures the dialogue with supervisor 9 by P30 and P37 and transmits signals MOD and CV on P34 and P35. Inputs P31, P32 and P33 can be used as interruption inputs, as a result of which each pulse H leads to the incrementation of the line count, its testing and the corresponding modification of the addresses. For example, in the case of 512 framed lines, it is possible to pass the content of 64 lines into each module (32 for the even frame and 32 for the uneven frame) with initialization of the count at 0 or 1, depending on whether it is an even or uneven frame, advance by 2 at each pulse H, switching of SELi, SELi+1 during zero passage (equal to 64 because counting takes place on 6 bits). On transmitting an active signal on several wires SELi, the same information is supplied to several modules simultaneously. Bit A15 makes it possible to choose the particular half of each module $M_i$ in which the information is located. The combination of these two possibilities permits overlaps between successive image portions.

Control circuit C2 receives the horizontal synchronization H and, from the microcomputer, signals MOD (acquisition or restoration), NP (512 or 256 dots) and vertical centering CV (as hereinbefore). There is a certain simplification compared with the more general diagram of FIG. 4. Thus, the horizontal centering CH is invariable, so that there is no need to specify it. In the same way, the conversion frequency FC is implicit, F corresponding to 512 dots, F/2 corresponding to 256 dots. Moreover, the slave circuit C2 transmits the control signals of the converters (SYCAN, SYCNA and BL referred to hereinbefore), together with the specific control signals of the dynamic memories (SC and SR) and 7 address wires A2 to A8. It should be noted that these 7 addresses correspond to the row addresses (less significant), which have to be regularly advanced to ensure "refreshening". This facilitates the arbitration between the need for refreshening and the risk of making untimely entries in the memory. It is merely necessary to allow the empty operation of slave circuit C2 throughout the non-conversion cycles, with SR active (for refreshening) and SC inactive (for non-writing). As the range of possibilities is limited to 512 to 256, configurator C3 merely comprises a multiplexer (for A8 and A9) under the control of signal NP.

It has been seen that the two least significant bits A0 and A1 disappear from the address bus. Their function is performed in another form by two control signal beams, i.e. CDMX intended for demultiplexer DMX inserted between input converter 2 and data bus K, and CMUX intended for multiplexer MUX, inserted between data bus K and output converter 4. Thus, the information on bus K is sent at a rate which is 4 times lower than that of the converter's times lower than that of the converters. The multiplexer and demultiplexer are in each case constructed with 4 octal barriers in parallel, so that it is necessary to use four different control signals, but other arrangements are possible. A mixer MIX reconstitutes the signal at the output of the digital-analog converter.

The signals SYCAN, CMUX and SYCNA supplied by one of the sync counters (P1 or P2) under the control of programmable automaton C1, also make it possible, as a function of the automaton programme, to bring about a reconfiguration of the multiplexer and demultiplexer in order to obtain different possible operating modes: monochromatic picture or polychromatic picture.

What is claimed is:

1. An apparatus for the acquisition and restoration in real time of a picture formed by successive frames of scanning lines, comprising:
   picture production means supplying analog signals which are representative of a picture;
   at least one analog-digital converter receiving said analog signal and supplying first digital signals;
   first processing means for processing said first digital signals in order to output second digital signals representing said picture;
   storage means for storing said first digital signals and said second digital signals;
   at least one digital-analog converter for receiving and converting said signals from said storage means;
   means for synchronizing said picture production means and said digital-analog converter;
   a communication bus connected between said storage means, said first processing means and said converters;
   control means connected to said synchronizing means for controlling the addressing of said storage means and for synchronizing said converters wherein said control means includes a programmable automaton means and a wired control circuit means which wired control means is dependent on said automaton means and wherein said automaton means and said wired control circuit means have addressing outputs connected to addressing means of said storage means and wherein said wired control circuit means has synchronizing outputs connected to synchronizing inputs of said converters for permitting the acquisition and restoration of the picture corresponding to said digital signals recorded in said storage means.

2. The acquisition and display apparatus according to claim 1, wherein said programmable automaton includes a supervisor and wherein said automaton includes a controlling processor for controlling said dependent wired control circuit whereby said processor and said control circuit provide an addressable output to said storage means to enable said first processor means to process the digital values corresponding to one of the acquired and restored picture as a function of information supplied by said supervisor of said programmable automaton.

3. An acquisition and display apparatus according to claim 2, wherein said dependent control circuit addresses said storage means so as to enable said first processor means to process the digital values corresponding to the scanning lines of the picture as a function of the programming of said programmable automaton.

4. An acquisition and display apparatus according to claim 3, wherein said addressing outputs are connected to said addressing means of said storage means through a distributor member means.

5. An apparatus according to claim 3, further comprising:
a sync separator supplying position fixing signals wherein said fixing signals include a picture start signal, a vertical scanning signal, and a horizontal scanning signal and wherein said sync separator additionally supplies video signals which are free of sync pulses with said video signals being applied to said analog-digital converter and said fixing signals being applied to said programmable automaton by means of a switch.

6. An apparatus according to claim 5, further comprising:
a demultiplexer for demultiplexing the output of said analog-digital converter;
a multiplexer for receiving said processed digital values; and
a mixer means connected to the output of said digital-analog converter for mixing the output signals of said digital-analog converter with a sync signal supplied by said synchronizing means wherein the output of said mixer means is connected to a display means.

7. An apparatus according to claim 6, wherein said dependent control circuit comprises:

a conversion frequency generator actuated by said programmable automaton;
two counters connected to said programmable automaton and to said generator;
an address sequencer connected to said counters for controlling the addressing of such storage means wherein one of said two counters supplies sync signals to said demultiplexer, said analog-digital converter, said multiplexer and said digital-analog converter and wherein the other one of said two counters provides an horizontal synchronization scanning signal to said automaton and said other one of said two counters receives a vertical centering signal from said automaton.

8. An apparatus according to claim 7, wherein one of said two counters supplies, under the control of said programmable automaton, signals which, as a function of the automaton program, control said multiplexer and said demultiplexer to obtain one of a monochromatic picture and a polychromatic picture.

9. An apparatus according to claim 7, wherein said controlling processor of said programmable automaton has inputs connected to said switch and to said supervisor and wherein the outputs of said controlling processor are connected to said control circuit and to a plurality of storage flip-flops wherein said flip-flops have 3-state output amplifiers with the outputs of said flip-flops being connected to said addressing means of said storage means.

10. An apparatus according to claim 9, wherein said processor is a microcomputer loacted in a single housing.

11. An apparatus according to claim 9, wherein said picture production means is an electron microscope.

12. An apparatus according to claim 9, wherein said picture production means is a video source.

13. An apparatus according to claim 9, wherein said picture production means includes means for producing synthesized video pictures.

* * * * *